United States Patent
Sato

(10) Patent No.: US 7,350,811 B2
(45) Date of Patent: Apr. 1, 2008

(54) SIDE AIRBAG APPARATUS

(75) Inventor: Eiji Sato, Aichi-Ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/392,597

(22) Filed: Mar. 30, 2006

(65) Prior Publication Data
US 2006/0220359 A1  Oct. 5, 2006

(30) Foreign Application Priority Data
Apr. 1, 2005 (JP) .............................. 2005-105962
Dec. 1, 2005 (JP) .............................. 2005-348323

(51) Int. Cl.
*B60R 21/016* (2006.01)
(52) U.S. Cl. .............................. 280/743.2; 280/730.1; 280/730.2; 280/743.1
(58) Field of Classification Search ............. 280/730.2, 280/730.1, 743.1, 743.2
See application file for complete search history.

(56) References Cited

U.S. PATENT DOCUMENTS

| | | | | |
|---|---|---|---|---|
| 5,718,450 A * | 2/1998 | Hurford et al. | .......... | 280/730.2 |
| 5,722,685 A * | 3/1998 | Eyrainer | .................... | 280/730.2 |
| 5,868,420 A * | 2/1999 | Higashiura et al. | ...... | 280/730.2 |
| 6,062,594 A * | 5/2000 | Asano et al. | ............. | 280/730.2 |
| 6,155,598 A * | 12/2000 | Kutchey | .................... | 280/730.2 |
| 6,561,539 B1 * | 5/2003 | Sunabashiri et al. | ..... | 280/730.1 |
| 6,712,389 B2 * | 3/2004 | Mauleon | ................... | 280/743.2 |
| 6,997,473 B2 * | 2/2006 | Tanase et al. | ............ | 280/730.2 |
| 7,121,580 B2 * | 10/2006 | Sato et al. | ................ | 280/730.2 |
| 7,192,053 B2 * | 3/2007 | Thomas | ........................ | 280/739 |
| 2003/0168836 A1 * | 9/2003 | Sato et al. | ................ | 280/730.2 |
| 2004/0021304 A1 * | 2/2004 | Tanase et al. | ................ | 280/729 |
| 2004/0124615 A1 * | 7/2004 | Tanase et al. | ............ | 280/730.2 |
| 2004/0188989 A1 * | 9/2004 | Kanto et al. | ............. | 280/730.2 |
| 2005/0023808 A1 * | 2/2005 | Sato et al. | ................ | 280/730.2 |
| 2005/0104342 A1 * | 5/2005 | Jackson et al. | .......... | 280/730.2 |
| 2006/0022441 A1 * | 2/2006 | Hayashi et al. | .......... | 280/730.2 |

(Continued)

FOREIGN PATENT DOCUMENTS

JP    A-2004-291789    10/2004

*Primary Examiner*—Paul N. Dickson
*Assistant Examiner*—Timothy D. Wilhelm
(74) *Attorney, Agent, or Firm*—Posz Law Group, PLC

(57) ABSTRACT

A side airbag apparatus for a vehicle has a gas generator with gas ports, an airbag. With gas injected from the gas ports, the airbag is deployed and inflated between a side portion of a body of the vehicle and a passenger seated on a seat provided in a passenger compartment. The airbag has first and second inflation portion. The first inflation portion is deployed and inflated at a position that corresponds to a shoulder of a passenger having a small physical size. The second inflation portion communicates with the first inflation portion. The second inflation portion is deployed and inflated at a position that corresponds to the abdomen of the passenger having a small physical size. The gas ports are arranged such that gas injected from the gas ports is introduced into the first inflation portion before the second inflation portion. The apparatus further includes a thickness limiting portion located between the first inflation portion and the second inflation portion and a tether. When the airbag is deployed and inflated, the thickness limiting portion limits the thickness of the airbag. The tether connects an upper end of the airbag and the thickness limiting portion to each other.

11 Claims, 6 Drawing Sheets

U.S. PATENT DOCUMENTS

2006/0076759 A1* 4/2006 Tanase et al. ............ 280/730.2
2006/0232054 A1* 10/2006 Schlosser et al. ........ 280/743.2
2007/0216142 A1* 9/2007 Honda et al. ............ 280/730.2

* cited by examiner

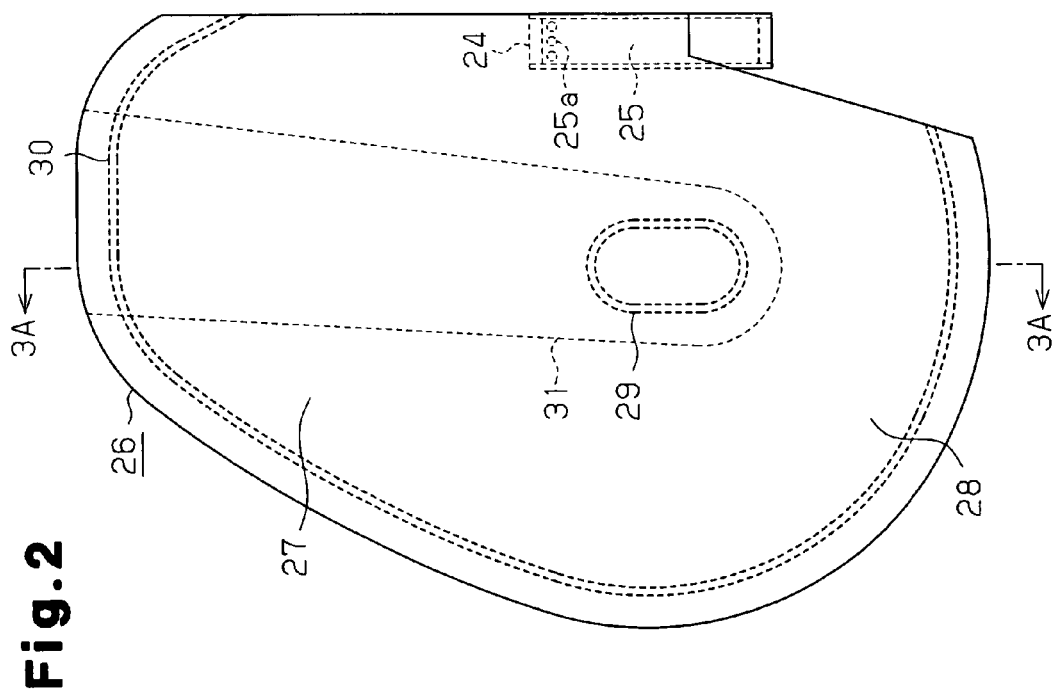
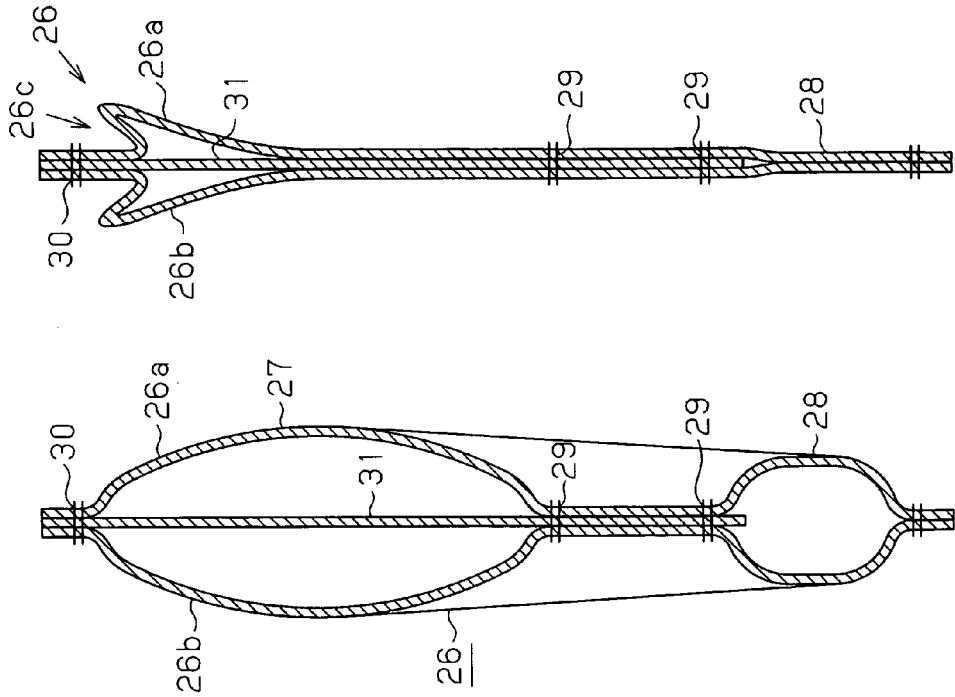

SIDE AIRBAG APPARATUS

BACKGROUND OF THE INVENTION

The present invention relates to a side airbag apparatus that deploys and inflates an airbag on a side of an occupant.

A typical side airbag apparatus deploys and inflates an airbag on a side of an occupant when an impact having a magnitude not less than a predetermined value is applied to a body side portion of the vehicle due to a collision to the side of the vehicle (side collision), thereby absorbing the impact to protect the thorax or lumbar regions of the occupant. As such a side airbag apparatus, a type has been known that, in consideration of the manner in which a side portion of a vehicle body intrudes into the passenger compartment at a collision, deploys and inflates an airbag that corresponds to an area including a shoulder and the lumbar regions of an occupant (for example, refer to Japanese Laid-Open Patent Publication No. 2004-291789).

Due to recent improvements of the rigidity of lower parts of vehicles, even if an impact of a collision is applied to a side portion of a vehicle body and the magnitude of the collision is not less than a certain value, the lumbar regions of the occupant receive a relatively small impact as compared to the impact applied to the other sections in the area including the shoulder and the lumbar regions. However, the shoulder still receives a considerable impact at a collision. Accordingly, it has been desired that a section of an airbag that corresponds to a shoulder be deployed and inflated prior to the deployment and inflation of the remainder at a side collision.

However, the side airbag apparatus disclosed in Japanese Laid-Open Patent Publication No. 2004-291789 is configured to first deploy and inflate a portion of the airbag that corresponds to the lumbar regions of an occupant. Therefore, taking into consideration the fact that, as described above, a side collision to a recent vehicle causes a side portion the vehicle to intrude into the passenger compartment in a falling manner, the airbag apparatus of the publication still has room for improvement to deploy and inflate a portion of an airbag that corresponds to a shoulder prior to the remainder of the airbag.

When an airbag apparatus is configured to deploy and inflate a portion of an airbag that corresponds to a shoulder prior to the remainder of the airbag, differences in physical sizes of occupants must be taken into consideration. This is because the position of the shoulders greatly vary depending on the physical sizes of occupants. When taking such differences in physical sizes of occupants into consideration, determining a reference physical size to be that of a relatively large occupant causes the following problems. That is, since the position of shoulders of a small occupant is lower than a large occupant, a space can be created between such a small occupant and the body side portion of the vehicle at a collision. It is therefore difficult to restrain the shoulder of a small occupant with the airbag.

SUMMARY OF THE INVENTION

Accordingly, it is an objective of the present invention to provide a side airbag apparatus that reliably protects an occupant irrespective of the physical size of the occupant.

To achieve the foregoing objectives, the present invention provides a side airbag apparatus for a vehicle. The apparatus includes a gas generator, an airbag, first and second inflation portions. The gas generator has a gas port. With gas injected from the gas port of the gas generator, the airbag is deployed and inflated between a side portion of a body of the vehicle and a passenger seated on a seat provided in a passenger compartment. The first and second inflation portions are provided in the airbag and communicate with each other. The first inflation portion is deployed and inflated at a position that corresponds to a shoulder of a passenger having a small physical size. The second inflation portion is deployed and inflated at a position that corresponds to the abdomen of the passenger having a small physical size. The gas port is arranged to inject gas into the first inflation portion when the airbag is deployed and inflated.

The present invention provides another side airbag apparatus for a vehicle. The apparatus includes a gas generator, an airbag, first and second inflation portions, a thickness limiting portion, and a tether. The gas generator has a gas port. With gas injected from the gas port of the gas generator, the airbag is deployed and inflated between a side portion of a body of the vehicle and a passenger seated on a seat provided in a passenger compartment. The airbag has a thickness along a lateral direction of the vehicle. The first inflation portion is deployed and inflated at a position that corresponds to a shoulder of a passenger having a small physical size. The second inflation portion communicates with the first inflation portion, and is deployed and inflated at a position that corresponds to the abdomen of the passenger having a small physical size. The gas port is arranged such that gas injected from the gas port is introduced into the first inflation portion before the second inflation portion. The thickness limiting portion is located between the first inflation portion and the second inflation portion. When the airbag is deployed and inflated, the thickness limiting portion limits the thickness of the airbag. The tether is located in the airbag and connects an upper end of the airbag and the thickness limiting portion to each other.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a side view illustrating the airbag according to the embodiment of FIG. 1 in a deployed and inflated state;

FIG. 3A is a cross-sectional view taken along line 3A-3A in FIG. 2;

FIG. 3B is a cross-sectional view illustrating the airbag when unfolded without supplying gas to the interior;

DETAILED DESCRIPTION OF THE PREFERRED EMBODIMENTS

One embodiment of the present invention will now be described with reference to the drawings. In the embodiment, the traveling direction of a vehicle (forward direction) is assumed to correspond to a front direction (frontward of the vehicle). Unless otherwise specified, a vertical direction and a lateral direction coincide with the vertical direction and the lateral direction with respect to the vehicle traveling direction.

Figure 1:
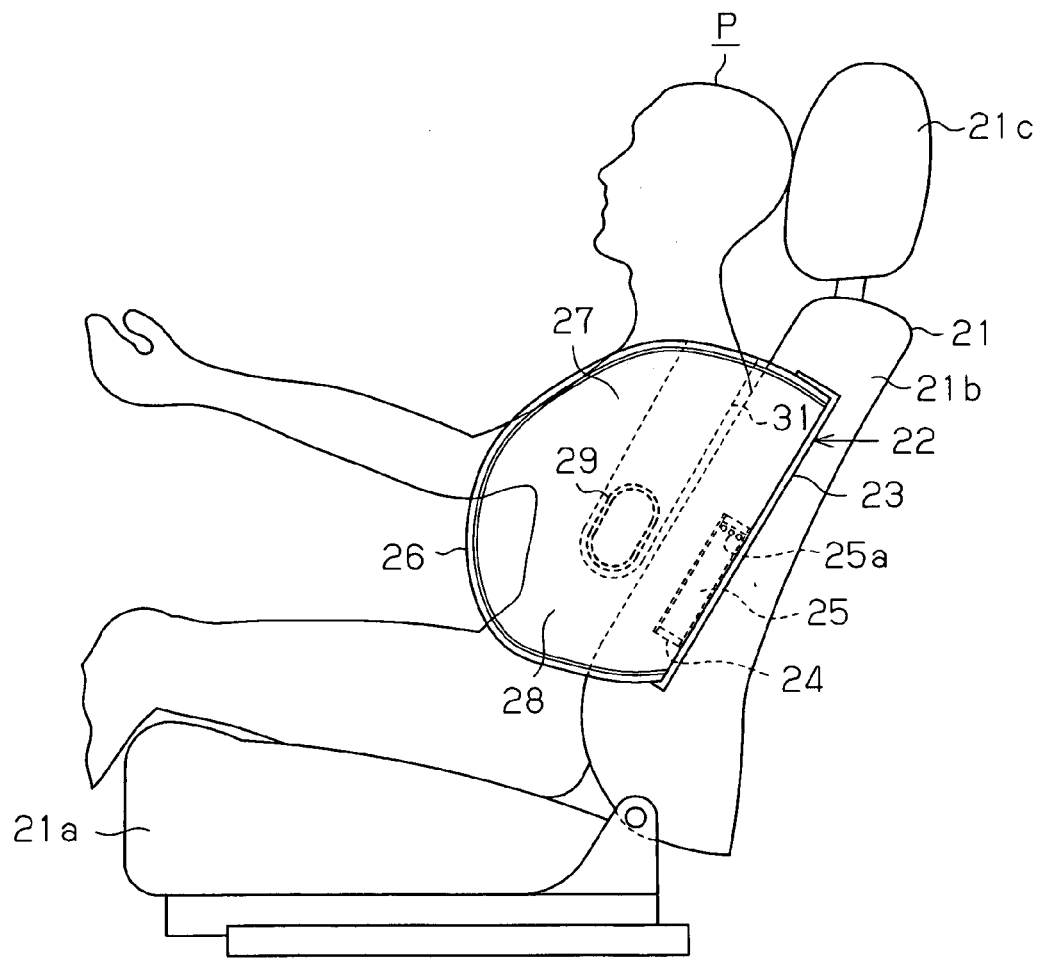
FIG. 1 is a side view illustrating an airbag according to one embodiment in a deployed and inflated state with an occupant and a vehicle seat.

FIG. 1 shows a left front seat 21 located in a passenger compartment. The front seat 21 includes a seat portion 21a and a backrest 21b. A side airbag apparatus 22 that is accommodated in a case 23 is incorporated in an outer side (left side) of the backrest 21b of the front seat 21. The side airbag apparatus 22 corresponds to a door (not shown), which forms part of a body side portion of the vehicle. Although only the left front seat 21 is illustrated in the drawings, a right front seat has a similar airbag apparatus 22 in the right side of the backrest.

As shown in FIG. 1, the side airbag apparatus 22 has a cylindrical retainer 24, a gas generator, and an airbag 26. The gas generator is a cylindrical inflator 25 swaged to the retainer 24 in this embodiment. The airbag 26 covers the retainer 24 and the inflator 25. The airbag 26 is fixed to the case 23 with bolts while being held between the retainer 24 and the case 23. The inflator 25 incorporates gas generating agent that generates gas to deploy and inflate the airbag 26. Gas ports 25a are provided at the upper portion of the inflator 25. Gas generated by gas generating agent is injected through the gas ports 25a.

The inflator 25 is electrically connected to an impact sensor (not shown) that detects impact applied to the body side portion. When the body side portion of the vehicle receives an impact the magnitude of which is not less than a predetermined value, the sensor sends a detection signal to the inflator 25. Accordingly, the gas generating agent in the inflator 25 generates gas, which is in turn injected upward through the gas ports 25a into an upper portion of the airbag 26, so that the entire airbag 26 is deployed and inflated.

As shown in FIG. 1, the airbag 26 is designed to be deployed and inflated to cover an area including a shoulder and the abdomen of an occupant P having a small physical size when the occupant P is properly seated on the front seat 21. The occupant P having a small physical size refers to a person whose shoulders are not higher than the top of the backrest 21b (except for a headrest 21c) when properly seated on the front seat 21. The occupant P having a small physical size may refer to a person that has an equal or smaller physical size (seated height) than the physical size of a Side Impact Dummy-second [II] generation small (SID-IIs). The crash dummy was developed by the Occupant Safety Research Partnership (OSRP) organized by American carmakers. The airbag 26 includes a first inflation portion 27 and a second inflation portion 28. The first inflation portion 27 is deployed and inflated at a position corresponding to a shoulder of the occupant (in an upper part of the airbag 26). The second inflation portion 28 communicates with the first inflation portion 27 and is deployed and inflated at a position corresponding to the abdomen of the occupant (in a lower part of the airbag 26).

FIG. 2 is a side view showing the airbag 26 in a deployed and inflated state, and FIG. 3A is a cross-sectional view taken along line 3A-3A of FIG. 2. As shown in FIGS. 2 and 3A, the airbag 26 has a pair of ground fabric sheets 26a, 26b made of, for example, woven cloth. The ground fabric sheets 16a, 16b are sewn together at the periphery to form the airbag 26. When unfolded with no gas supplied to the interior, the airbag 26 is flat (see FIG. 3B), and is normally accommodated in the case 23 in a folded-up state (see FIG. 1). Between the first inflation portion 27 and the second inflation portion 28 of the airbag 26, a seam 29 is provided in a position corresponding to a thorax of the occupant P (see FIG. 1). The seam 29 has an oblong shape and is formed by sewing the fabric sheets 26a, 26b without any space in between.

The seam 29 serves as a thickness limiting portion. When the airbag 26 is deployed and inflated, the lateral dimension of the airbag 26 is regarded as the thickness of the airbag 26. At the seam 29, the thickness of the airbag 26 is less than that of the first inflation portion 27 and the second inflation portion 28 when the airbag 26 is deployed and inflated. A tether 31 is provided in the airbag 26 to connect the seam 29 with a peripheral sewn portion 30 at an upper end of the airbag 26. That is, one end of the tether 31 is sewn to the ground fabric sheets 26a, 26b at the peripheral sewn portion 30, while the other end is sewn to the ground fabric sheets 26a, 26b by the seam 29. When the airbag 26 is unfolded from the side of the seam 29 along the tether 31 without supplying gas to the interior, a slack portion 26c is formed at the peripheral sewn portion 30.

Next, a method for folding up the airbag 26 so that the airbag 26 can be accommodated in the case 23 will be described with reference to FIGS. 4A to 8B.

Figure 4A:
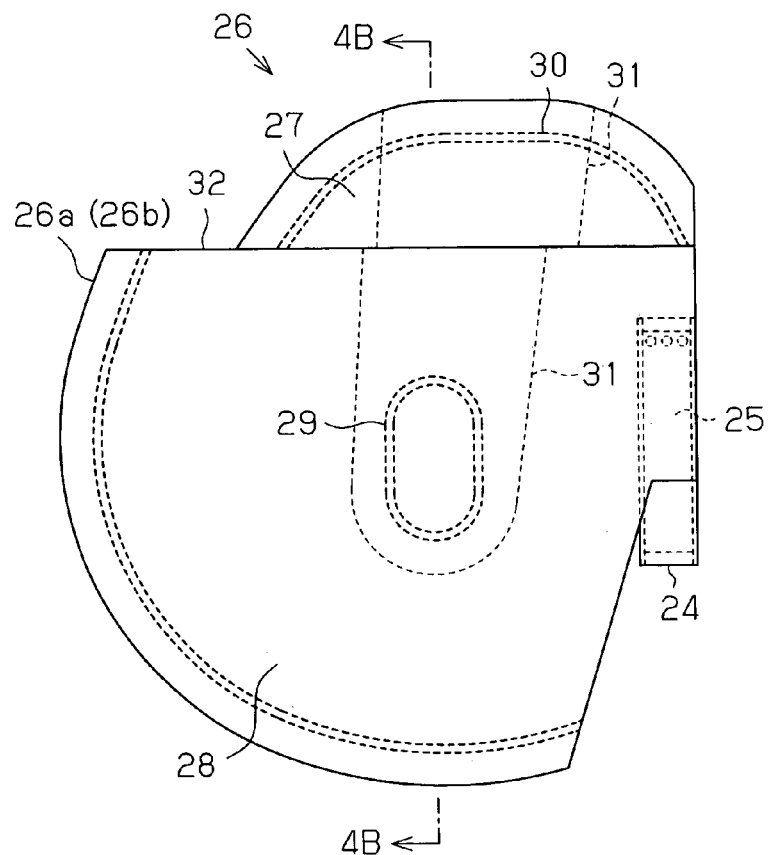
FIG. 4A is a side view illustrating the airbag in a folding-up process, when a first inflation portion is tucked into the interior when being folded.
Figure 4B:
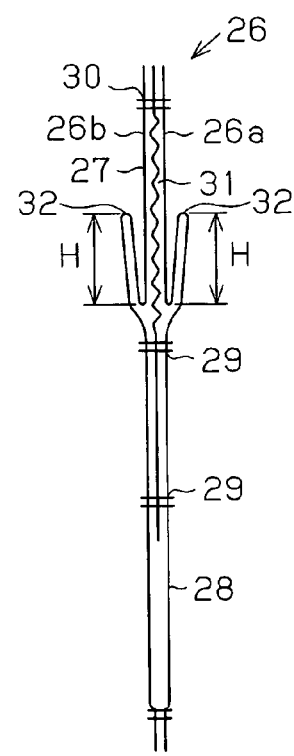
FIG. 4B is a cross-sectional view taken along line 4B-4B in FIG. 4A.
Figure 4C:
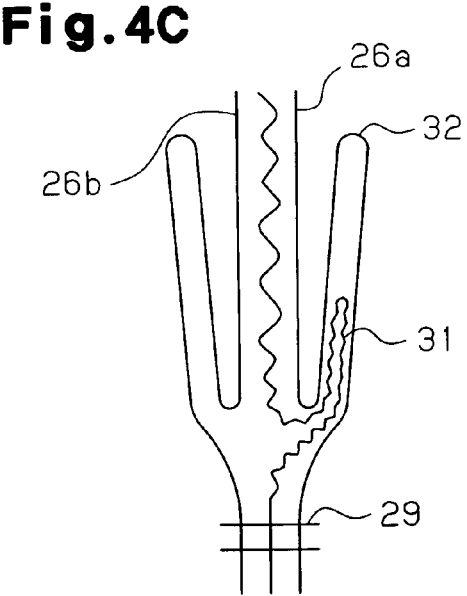
FIG. 4C is a partially enlarged view of FIG. 4B.

FIGS. 4A and 4B each show the airbag 26 in a the process of being folded up. As shown in FIGS. 4A and 4B, when folding up the airbag 26, first a part of the first inflation portion 27 is tucked into the airbag 26, so that a pair of first wings 32, which are mountain folded, are formed with the first inflation portion 27 in between. In FIG. 4B, the tether 31 in a rumpled state between the peripheral sewn portion 30 and the seam 29 is depicted by a wavy line. As shown in FIG. 4B, the airbag 26 is folded up such that the first wings 32 of a width H are formed and the tether 31 is rumpled. As shown in FIG. 3B, the first wings 32 may be created without rumpling the tether 31. In this case, the width of the first wings 32 is less than the width H of the case in which the tether 31 is rumpled. In the example shown in FIG. 3B, the rumpled tether 31 is located between the left and right ground fabric sheets 26a, 26b. Further, the rumpled tether 31 may be located in the left first wing 32 as shown in FIG. 4C or in the right first wing 32. Likewise, tethers 31 shown in FIGS. 5B and 6B may also be located in any of wings.

Figure 5A:
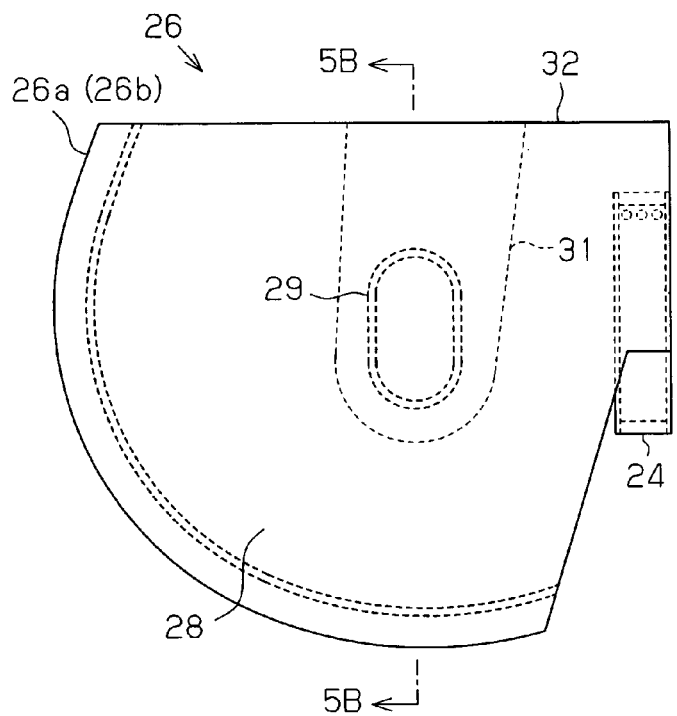
FIG. 5A is a side view illustrating the airbag in the folding-up process, when the first inflation portion has been tucked into the interior.
Figure 5B:
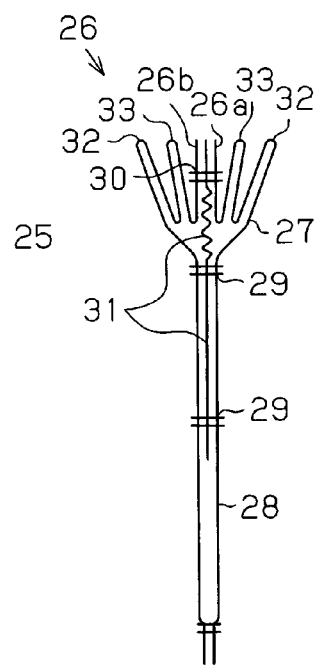
FIG. 5B is a cross-sectional view taken along line 5B-5B in FIG. 5A.
Figure 6A:
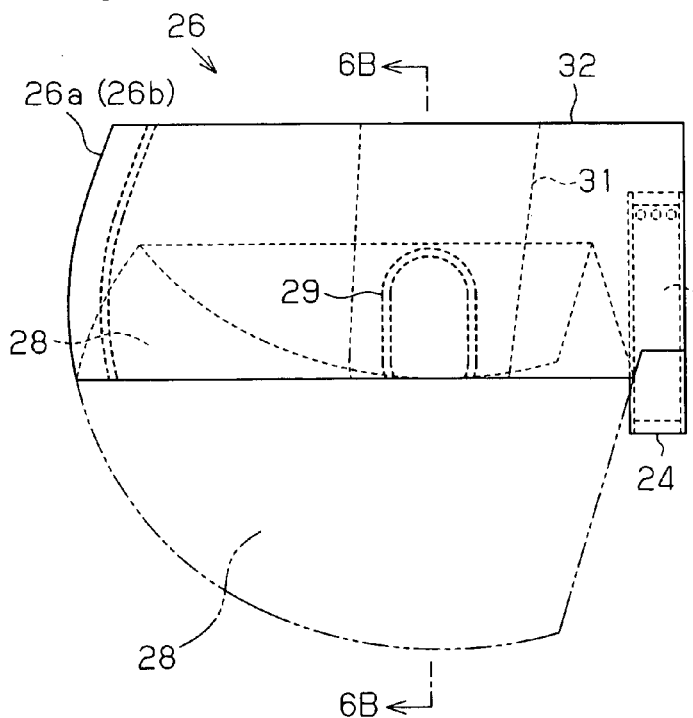
FIG. 6A is a side view illustrating the airbag in the folding-up process, when a second inflation portion has been folded back.
Figure 6B:
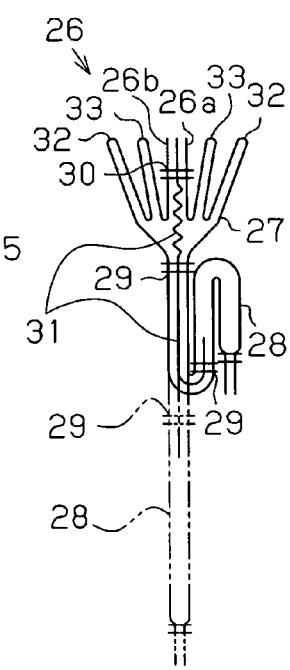
FIG. 6B is a cross-sectional view taken along line 6B-6B in FIG. 6A.
Figure 7A:
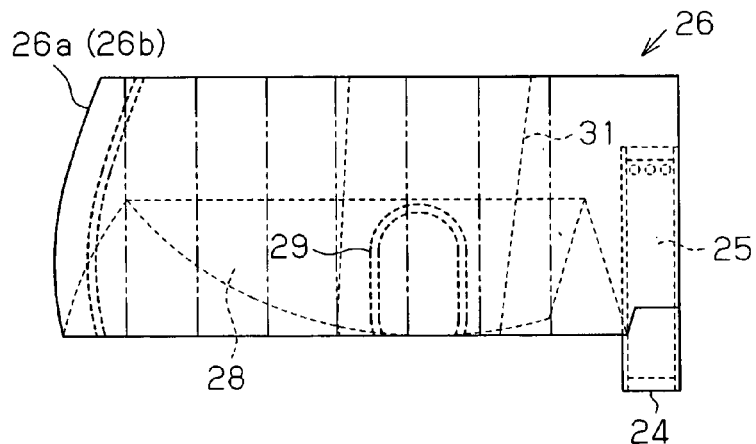
FIG. 7A is a side view illustrating a manner in which the airbag is folded up.
Figure 7B:
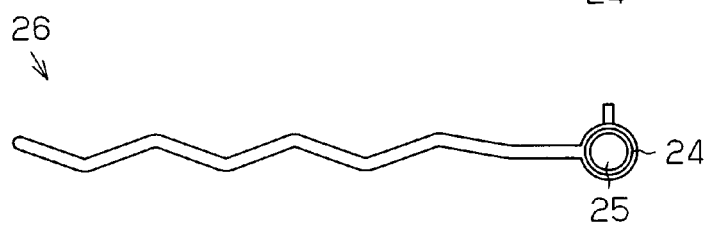
FIG. 7B is a diagrammatic bottom view of FIG. 7A.
Figure 8A:
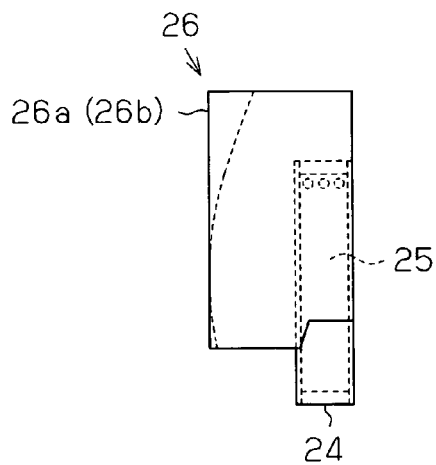
FIG. 8A is a side view illustrating the airbag when folded up.
Figure 8B:
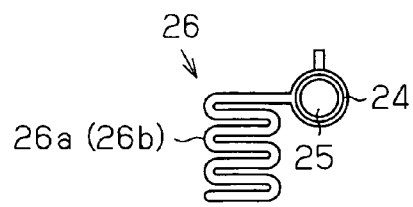
FIG. 8B is a diagrammatic bottom view of FIG. 8A.

Next, as shown in FIGS. 5A, 5B, the remainder of the first inflation portion 27 is tucked into the airbag 26, so that a pair of second mountain so that a pair of second wings 33, which are mountain folded, inside the first wings 32 and with the first inflation portion 27 in between. At this time, the upper ends of the first inflation portion 27 and the wings 32, 33 are aligned. Then, as shown in FIGS. 6A, 6B, the entire second inflation portion 28 is folded on the side of deployment and inflation of the airbag 26, that is, on the side toward the occupant P. The distal portion of the folded second inflation portion 28 is folded in the opposite direction. Subsequently, as shown in FIGS. 7A, 7B, mounting folding and valley folding along chain double-dashed lines extending vertically in FIG. 7A are repeated substantially at regular intervals in a direction from the rear end toward the front end of the airbag 26 so that the airbag 26 is accordion-folded as shown in FIGS. 8A, 8B. The airbag 26 is then covered with a cover (not shown) and fixed in the case 23.

The operation of the side airbag apparatus 22 described above will now be described wither reference to FIGS. 1 to 3B.

When an impact having a magnitude not less than a predetermined value is applied to a body side portion of the vehicle due to a collision to a side (side collision), gas is injected into the first inflation portion 27 from the gas ports 25a of the inflator 25, so that the first inflation portion 27 is deployed and inflated. In this case, although the first inflation portion 27 is deployed and inflated while being pushed upward, the tension of the tether 31 limits the upward projection of the first inflation portion 27. This converts the flow of gas toward the upper portion of the first inflation portion 27 into leftward and rightward expansion force at the upper end of the tether 31, which increases the lateral dimension of the first inflation portion 27. Successively, the gas flows from the first inflation portion 27 toward the second inflation portion 28, so that the second inflation portion 28 is deployed and inflated. The entire airbag 26 is thus deployed and inflated. At this time, the thickness of the portion of the airbag 26 that corresponds to the seam 29 is limited to be less than those of the first inflation portion 27 and the second inflation portion 28.

In this embodiment, since the rigidity of the lower parts of the vehicle is greater than that of the upper parts, an impact applied to the body side portion causes the body side portion to intrude in the passenger compartment as if it pivots and falls about the lower end. That is, the body side portion intrudes in the passenger compartment as if it is leaning against the shoulder of the occupant P. Thus, in terms of reliably protecting the occupant P, it is desirable that the first inflation portion 27 of the airbag 26 be deployed and inflated prior to the remainder.

In this respect, the side airbag apparatus 22 of this embodiment is configured such that the first inflation portion 27 of the airbag 26 is deployed and inflated prior to deployment and inflation of the remainder of the airbag 26, and the tether 31 functions to increase the thickness of the first inflation portion 27. Therefore, the first inflation portion 27 effectively restrains the shoulder of the occupant P, thereby reliably protecting the occupant P. Further, when the airbag 26 is deployed and inflated, the seam 29 limits the thickness of the airbag 26 at a portion corresponding to the thorax of the occupant P to be less than the thickness of the first inflation portion 27 and the second inflation portion 28. The airbag 26 is thus capable of gently protecting the thorax of the occupant P. Since the body side portion intrudes into the passenger compartment as if leaning against the shoulder of the occupant P, the abdomen the occupant P receives less impact than the shoulder. The deployment and inflation of the second inflation portion 28 reliably protects the abdomen of the occupant P. Therefore, the airbag 26 reliably protects a large area of the body of the occupant P from the shoulder to the abdomen.

If an occupant having a larger physical size than the occupant P uses a vehicle equipped with the side airbag apparatus 22 of this embodiment, the position of the shoulders is higher than that of the occupant P. Thus, a position corresponding to the shoulders of the occupant P corresponds to the position of the thorax of the occupant having a larger physical size. Even in such a case, since the impact resistance of the thorax of the occupant having a larger physical size is equivalent to that of the shoulder of the occupant P, who has a relatively small physical size, the occupant having a larger physical size is reliably protected.

The above described embodiment has the following advantages.

Particularly in a case where the rigidity of a vehicle is greater in lower parts than in upper parts of a vehicle, since the first inflation portion 27 is deployed and inflated prior to the remainder, the occupant P having a small physical size (the physical size of a crash dummy specified by SID-IIs) is reliably protected.

Since the airbag 26 is folded up after the first inflation portion 27 is partly tucked in the airbag 26, the first inflation portion 27 is deployed and inflated in a shorter time compared to a case in which the airbag 26 is folded after the first inflation portion 27 is folded back.

Since the airbag 26 is folded up after the second inflation portion 28 is folded back on the side of the deployment and inflation, or on the side toward the occupant P, the second inflation portion 28 and the body side portion (for example, the armrest of the door) are prevented from interfering each other when the airbag 26 is deployed and inflated. Thus, the second inflation portion 28 is smoothly deployed and inflated.

Since the airbag 26 has the seam 29 at a position that corresponds to the thorax of the occupant P, the thickness of this section is less than the remainder of the airbag 26 when the airbag is deployed and inflated. The thorax of the occupant P is therefore gently protected.

When the airbag 26 is deployed and inflated, the tether 31 converts part of the upward expansion force of the first inflation portion 27 into leftward and rightward expansion force. Thus, the lateral thickness of the first inflation portion 27 is increased. The shoulder of the occupant P is therefore reliably restrained.

The embodiment illustrated in FIGS. 1 to 8B may be modified as follows.

Figure 9A:
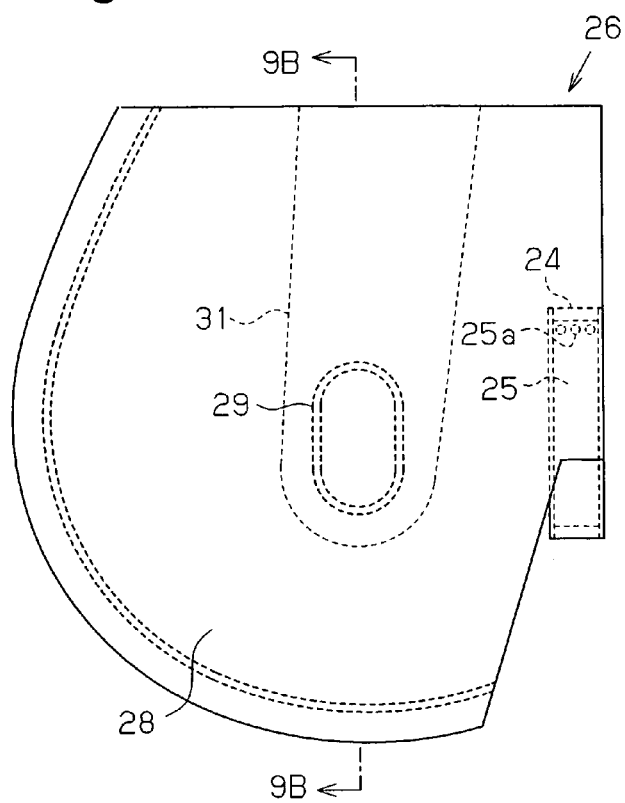
FIG. 9A is a side view illustrating an airbag according to a modified embodiment in a folding-up process, when a first inflation portion is tucked into the interior.
Figure 9B:
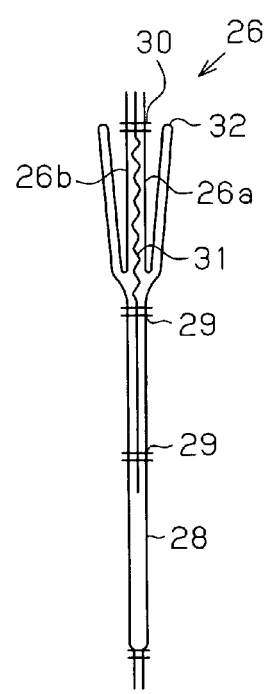
FIG. 9B is a cross-sectional view taken along line 9B-9B in FIG. 9A.

In the embodiment of FIGS. 1 to 8B, the airbag 26 may be folded in a manner shown in FIGS. 9A, 9B instead of the manner shown in FIGS. 4A, 4B. In the state shown in FIGS. 9A, 9B, the upper ends of the ground fabric sheets 26a, 26b correspond to the first wings 32. The airbag 26 of this modification is then folded up in a manner shown in FIGS. 5 and 6.

In the embodiment shown in FIGS. 1 to 8B, the tether 31 may be omitted.

In the embodiment shown in FIGS. 1 to 8B, the seam 29 may be omitted.

In the embodiment shown in FIGS. 1 to 8B, the second inflation portion 28 may be folded back on a side opposite to the side corresponding to the occupant P.

In the embodiment shown in FIGS. 1 to 8B, when folding up the airbag 26, a part (one section) of the first inflation portion 27 may be tucked in the airbag 26. Alternatively, two or more parts (two or more sections) of the first inflation portion 27 may be tucked into the airbag 26.

In the embodiment shown in FIGS. 1 to 8B, when folding up the airbag 26, the first inflation portion 27 may be folded back toward the occupant P or in a direction opposite to the side corresponding to the occupant P without tucking a part of it in the airbag 26.

The side airbag apparatus 22 of the illustrated embodiments may be mounted on a vehicle rear seat.

Figure 10:
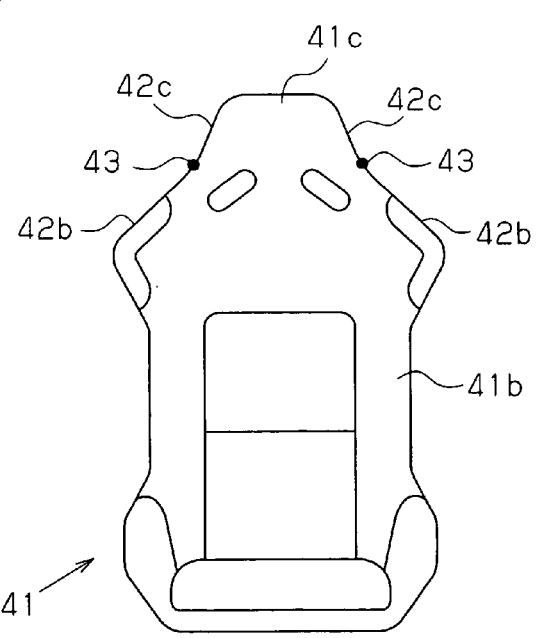
FIG. 10 is a front view illustrating a bucket seat according to another modified embodiment.

The side airbag apparatus 22 may be mounted on a bucket seat 41 shown in FIG. 10. In this case, the airbag 26 is designed to be deployed and inflated to cover an area including a shoulder and the abdomen of the occupant P of the embodiment shown in FIGS. 1 to 8B having a small physical size when the occupant is properly seated on the bucket seat 41. The occupant P having a small physical size refers to a person whose shoulders are not higher than the top of a backrest 41b (except for a headrest support 41c) when properly seated on the bucket seat 41. The boundary between the backrest 41b and the headrest support 41c is assumed to be similar to the boundary of the backrest 21b and the headrest 21c of the embodiment shown in FIGS. 1 to 8B. For example, the boundary may be assumed to be discontinuous parts between sides 42b of the backrest 41b and sides 42c of the headrest support 41c (intersections 43 of FIG. 10).

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus for a vehicle, comprising:
   a gas generator having a gas port;
   an airbag having a thickness along a lateral direction of the vehicle when deployed and inflated, wherein, with gas injected from the gas port of the gas generator, the airbag is deployed and inflated between a side portion of a body of the vehicle and a passenger seated on a seat provided in a passenger compartment;
   a first inflation portion and a second inflation portion provided in the airbag, the first and second inflation portions communicating with each other, wherein the first inflation portion is deployed and inflated at a position that corresponds to a shoulder of a passenger, wherein the second inflation portion is deployed and inflated at a position that corresponds to an abdomen of the passenger, and wherein the gas port is arranged to inject gas into the first inflation portion when the airbag is deployed and inflated;
   a thickness limiting portion located between the first inflation portion and the second inflation portion, wherein, when the airbag is deployed and inflated, the thickness limiting portion limits the thickness of the airbag; and
   a tether located in the airbag, wherein the tether is sewn to a part of a periphery of the airbag to connect an upper end of the airbag and the thickness limiting portion to each other and limit upward projection of the airbag.

2. The side airbag apparatus according to claim 1, wherein, prior to deployment and inflation, the airbag is accommodated in a backrest of the seat in a folded-up state, and
   wherein, in the folded-up state, at least part of the first inflation portion is tucked in the airbag.

3. The side airbag apparatus according to claim 2, wherein, in the folded-up state, the second inflation portion is folded back to the side corresponding to the passenger.

4. The side airbag apparatus according to claim 1, wherein the passenger has a physical size that corresponds to a physical size of a Side Impact Dummy second generation (SID-II) crash dummy.

5. The side airbag apparatus according to claim 2, wherein, in the folded-up state, the second inflation portion is folded back to the side corresponding to the passenger.

6. A side airbag apparatus for a vehicle, comprising:
   a gas generator having a gas port;
   an airbag, wherein, with gas injected from the gas port of the gas generator, the airbag is deployed and inflated between a side portion of a body of the vehicle and a passenger seated on a seat provided in a passenger compartment, the airbag having a thickness along a lateral direction of the vehicle when deployed and inflated;
   a first inflation portion provided in the airbag, wherein the first inflation portion is deployed and inflated at a position that corresponds to a shoulder of a passenger;
   a second inflation portion provided in the airbag so as to communicate with the first inflation portion, wherein the second inflation portion is deployed and inflated at a position that corresponds to the abdomen of the passenger, and wherein the gas port is arranged such that gas injected from the gas port is introduced into the first inflation portion before the second inflation portion;
   a thickness limiting portion located between the first inflation portion and the second inflation portion, wherein, when the airbag is deployed and inflated, the thickness limiting portion limits the thickness of the airbag; and
   a tether located in the airbag, wherein the tether is sewn to a part of a periphery of the airbag to connect an upper end of the airbag and the thickness limiting portion to each other.

7. The side airbag apparatus according to claim 6, wherein, prior to deployment and inflation, the airbag is accommodated in a backrest of the seat in a folded-up state, and
   wherein, in the folded-up state, at least part of the first inflation portion is tucked in the airbag.

8. The side airbag apparatus according to claim 7, wherein, when the at least part of the first inflation portion is tucked in the airbag, the tether is rumpled and a pair of wings are formed in the first inflation portion.

9. The side airbag apparatus according to claim 7, wherein, when the at least part of the first inflation portion is tucked in the airbag, the tether is rumpled and a pair of first wings and a pair of second wings are formed in the first inflation portion.

10. The side airbag apparatus according to claim 6, wherein the passenger has a physical size that corresponds to a physical size of a Side Impact Dummy second generation (SID-II) crash dummy.

11. A side airbag apparatus for a vehicle, comprising:
    a gas generator having a gas port;
    an airbag having a thickness along a lateral direction of the vehicle when deployed and inflated, wherein, with gas injected from the gas port of the gas generator, the airbag is deployed and inflated between a side portion of a body of the vehicle and a passenger seated on a seat provided in a passenger compartment;

a thickness limiting portion, wherein, when the airbag is deployed and inflated, the thickness limiting portion limits the thickness of the airbag; and a tether located in the airbag, the tether connecting a peripheral portion of the airbag and the thickness limiting portion to each other to limit upward projection of the airbag, wherein the tether is sewn to the peripheral portion of the airbag.

* * * * *